US012744864B1

(12) United States Patent
Hellmann et al.

(10) Patent No.: US 12,744,864 B1
(45) Date of Patent: Sep. 22, 2026

(54) CONCURRENT SPEAKER HIGHLIGHTING IN CONFERENCES

(71) Applicant: Zoom Communications, Inc., San Jose, CA (US)

(72) Inventors: Ashley Alexandra Hellmann, San Francisco, CA (US); Jonathan Walkula Kokotajlo, Brooklyn, NY (US); Robert Allen Ryskamp, Mountain View, CA (US); Adam Tow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 135 days.

(21) Appl. No.: 18/768,444

(22) Filed: Jul. 10, 2024

Related U.S. Application Data

(60) Provisional application No. 63/569,181, filed on Mar. 24, 2024.

(51) Int. Cl.
*H04N 7/15* (2006.01)
*H04N 7/14* (2006.01)

(52) U.S. Cl.
CPC ............. *H04N 7/152* (2013.01); *H04N 7/147* (2013.01)

(58) Field of Classification Search
CPC ............ H04L 12/1818; H04L 12/1822; H04N 19/167
See application file for complete search history.

(56) References Cited

U.S. PATENT DOCUMENTS

| | | | | |
|---|---|---|---|---|
| 8,614,735 | B2 | 12/2013 | Buckler | |
| 8,619,118 | B2 | 12/2013 | Wu et al. | |
| 9,288,435 | B2 | 3/2016 | Lachapelle et al. | |
| 9,942,518 | B1 * | 4/2018 | Tangeland | G06V 10/763 |
| 2018/0063480 | A1 * | 3/2018 | Luks | H04N 7/147 |
| 2019/0215464 | A1 | 7/2019 | Kumar et al. | |
| 2023/0103060 | A1 * | 3/2023 | Chaudhuri | G06V 20/41 382/118 |

* cited by examiner

*Primary Examiner* — Amal S Zenati
(74) *Attorney, Agent, or Firm* — Young Basile Hanlon & MacFarlane, P.C.

(57) ABSTRACT

A first audio data stream associated with a first conference participant of a conference is determined to meet predefined criteria. In response to determining that the first audio data stream meets the predefined criteria, a first representation of the first conference participant is added to a stage area of a user interface associated with the conference, where the user interface includes the stage area and a gallery area. A second audio data stream associated with a second conference participant of the conference is determined to meet the predefined criteria. In response to determining that the second audio data stream meets the predefined criteria, a second representation of the second conference participant is added to the stage area such that the stage area concurrently includes the first representation and the second representation.

20 Claims, 10 Drawing Sheets

CONCURRENT SPEAKER HIGHLIGHTING IN CONFERENCES

CROSS REFERENCE TO RELATED APPLICATIONS

This application claims the benefit of U.S. Provisional Patent Application Ser. No. 63/569,181, filed Mar. 24, 2024, the entire disclosure of which is incorporated herein by reference.

FIELD

This disclosure generally relates to video conference management, and, more specifically, to dynamically and concurrently highlighting multiple speakers during video conferences.

BRIEF DESCRIPTION OF THE DRAWINGS

This disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
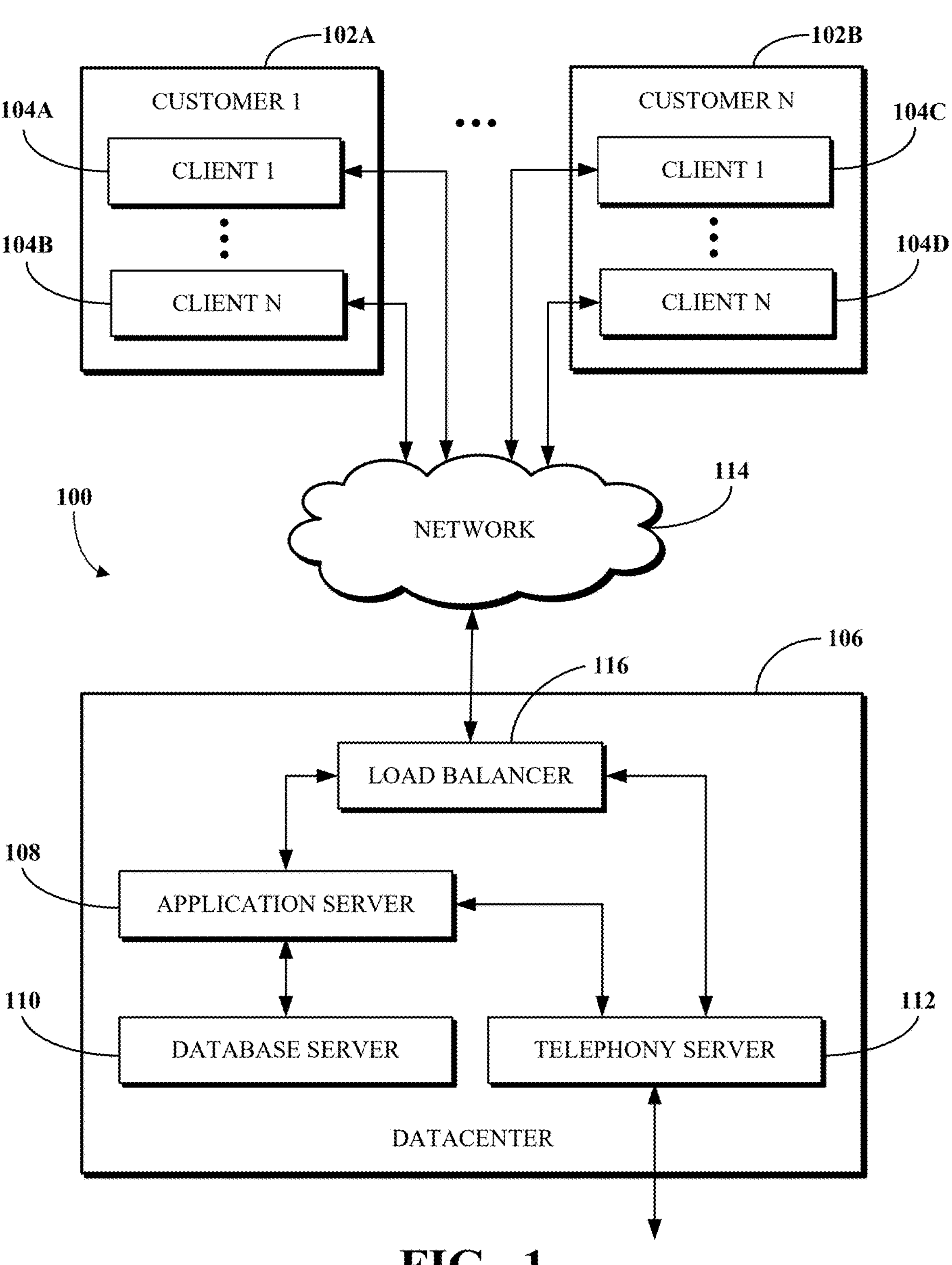
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

In conventional conferencing software, speaker identification and highlighting are central features designed to enhance video conferencing experience. Such software may offer two main views: a gallery view, where all participants are displayed in small rectangles (referred to as tiles) of approximately the same size, and an alternative, active speaker view, which prominently displays the current speaker within a large tile on the screen while relegating others to smaller tiles in less visible positions. In some configurations, the conferencing software may enable a spotlighting feature where, for example, a conference host can configure one of the participants as a speaker at least for a portion of the meeting. In gallery view, the active speaker can be highlighted with visual cues (such as with a colored bounding box), drawing the attention of the attendees to the speaker. With such features, the conferencing software is intended to mimic the natural flow of in-person meetings where participant attention shifts to the person actively speaking.

However, the conventional highlighting of only one speaker at a time is not optimal for all types of meetings. For instance, in brainstorming sessions or panel discussions, the conversation often involves multiple participants speaking in quick succession or even simultaneously. The binary choice between a single active speaker and a gallery view does not accommodate the dynamic nature of such interactions. Relying solely on highlighting a single speaker can lead to a disjointed experience where participants may miss non-verbal cues from others or feel disconnected from the group conversation. This approach can also cause distractions and a sense of disorientation when the highlighted speaker changes, particularly in meetings with frequent back-and-forth dialogue.

Implementations of this disclosure solve problems such as these by implementing dynamic speaker highlighting in video conferences that is capable of detecting and showcasing multiple active speakers simultaneously. Speakers are highlighted by employing a speaker detection algorithm that monitors and evaluates each participant's engagement in a video conference through a respective "speaker score."

A conferencing user interface associated with a video conference may be configured to include a stage area of active speakers and a gallery area that includes at least the non-active speakers. An "active speaker," as used herein, refers to a conference participant whose speaker score is such that the conference participant is displayed in the stage area. The speaker scores of the participants are continuously updated throughout the conference based on their speech activities (e.g., periods of silence and periods of active speaking). To illustrate, a speaker score of a conference participant may be incremented for every second of speech (e.g., speaking) and decremented for every second of silence thereby enabling dynamic and fluid video conferences that adapt the stage layout in real time, reflecting the ebb and flow of the meeting's conversational dynamics.

In a simple example, and without limitations, a conference participant is designated as an active speaker and added to the stage area if, for example, their speaker score exceeds a minimum speaking score value; and an active speaker is removed from the stage when their speaker score falls below a maximum silence score value. For example, a conference participant who continuously speaks for more than 2.5 seconds can be considered an active speaker and is displayed in the stage area; and an active speaker who remains silent for 20 seconds is removed from the stage area. As such, the conferencing system can ensure that the stage remains a space for current contributors.

Furthermore, by maintaining a gallery area of all participants (such as below the stage area) in the conferencing user interface, dynamic speaker highlighting ensures that the sense of community and inclusivity is preserved, enhancing the meeting experience by accurately mirroring the interactive and dynamic nature of live discussions. As such, a more engaging, natural, and intuitive virtual meeting environment is enabled, directing attention seamlessly to those contributing to the conversation, while providing a cohesive and comprehensive view of the meeting's context.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for dynamic highlighting of multiple speakers. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
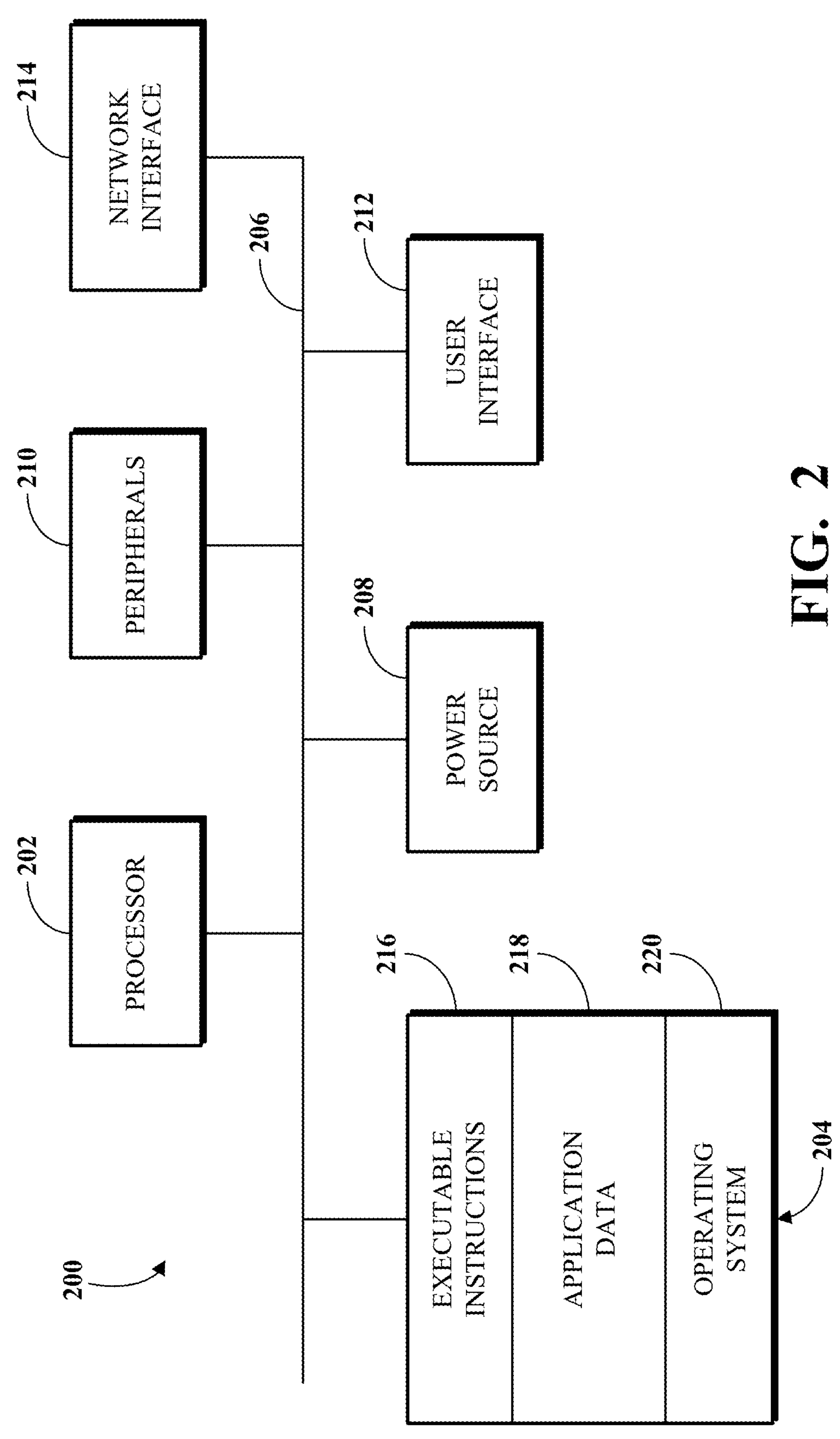
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
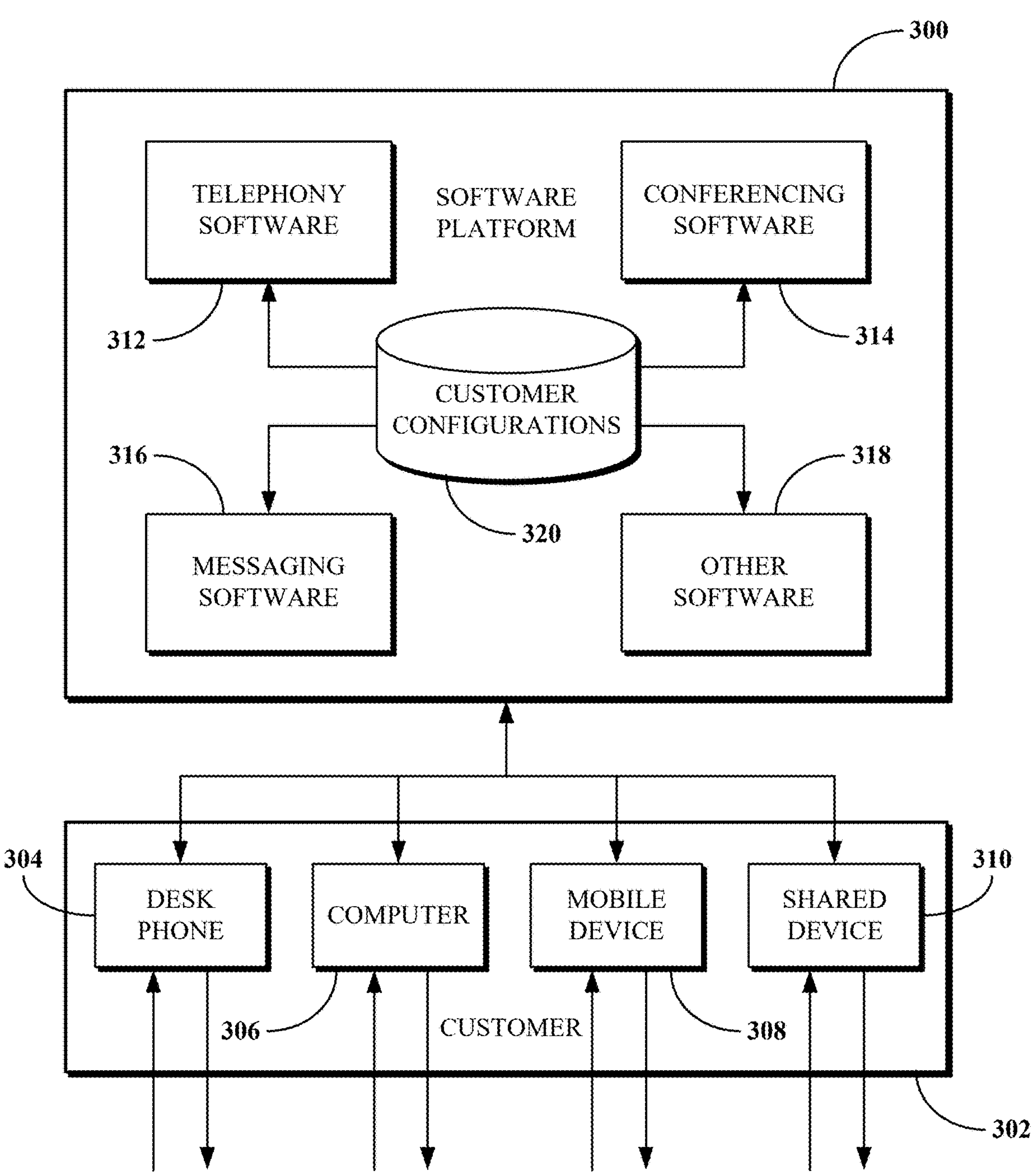
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call that is in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a dynamic speakers software that is usable for dynamically and concurrently highlighting multiple speakers in conferences. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
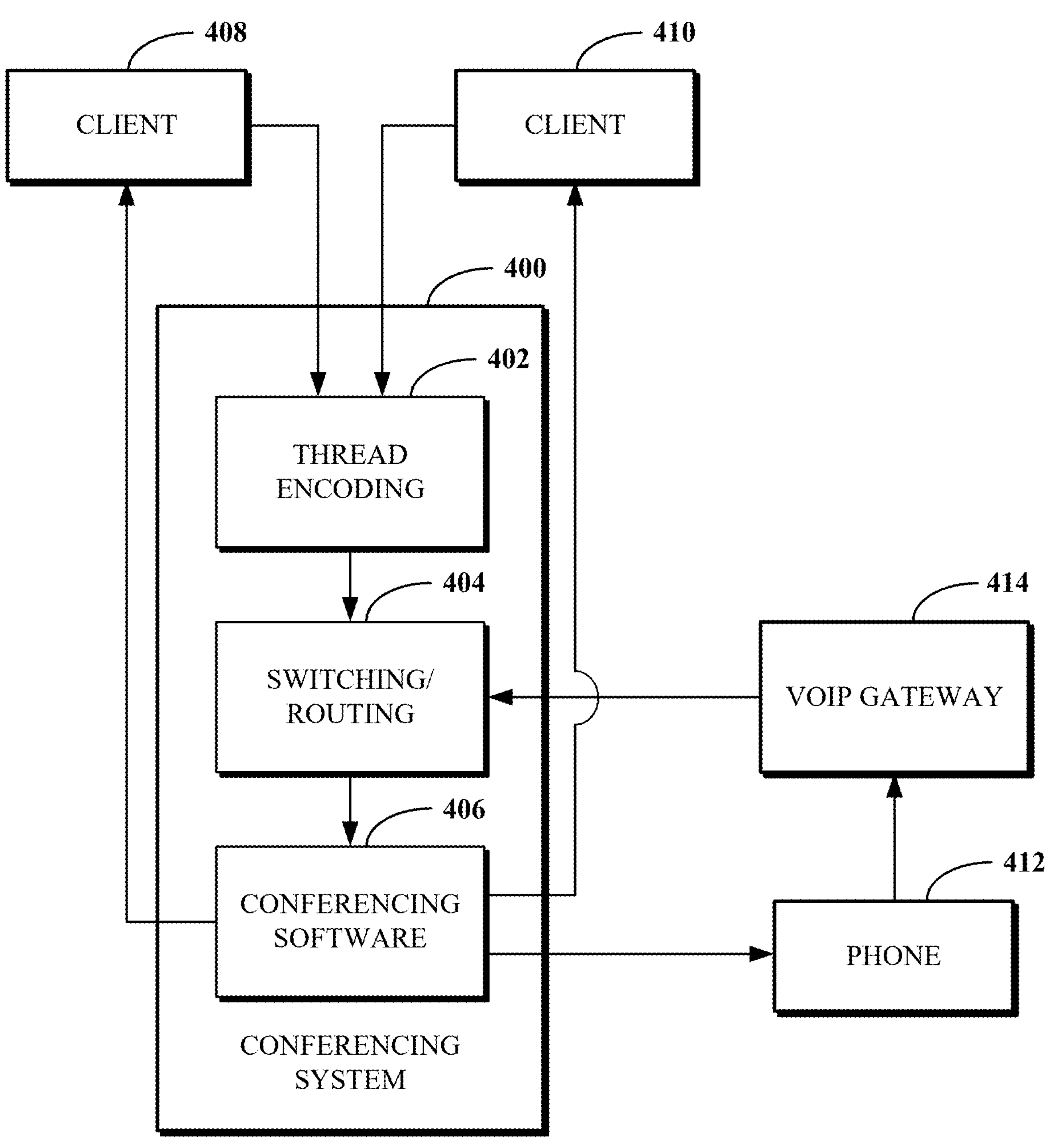
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 620p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to as an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
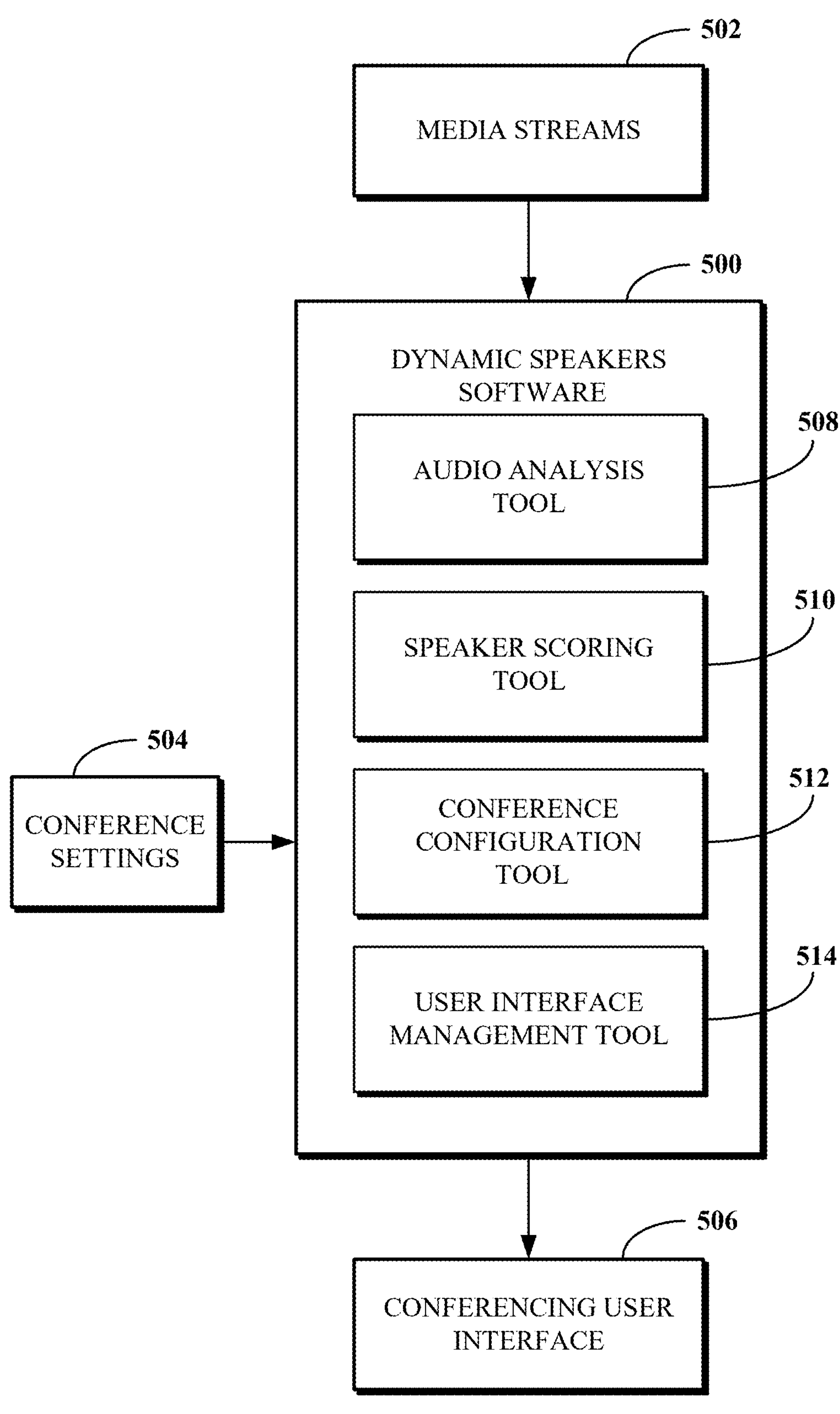
FIG. 5 is a block diagram of an example of functionality of a dynamic speakers software that dynamically highlights multiple speakers in a video conference.

FIG. 5 is a block diagram of an example of functionality of a dynamic speakers software 500 that dynamically highlights multiple speakers in a video conference. The dynamic speakers software 500 can be implemented by a software platform, such as the software platform 300 for FIG. 3. As such, the dynamic speakers software 500 can be or can be included in the conferencing software 314 of FIG. 4 or the other software 318 of FIG. 3. The dynamic speakers software 500 can be implemented by a client associated with a conference participant, such as one of the clients 408 and 410 of FIG. 4. For example, the dynamic speakers software 500 may be included in or otherwise accessed and used by a client application that runs on the client and is used to connect the client to a video conference.

When implemented by the software platform, the dynamic speakers software 500 can maintain speaker scores on behalf of all conference participants and regularly transmit their speaker scores to the respective clients of the conference participants. A determination as to which conference participants are to be designated as active speakers may be made locally at each client taking into consideration input including, for example, user preferences and pinned conference participants, which are further described herein.

The dynamic speakers software 500 receives media streams 502 and may receive conference settings 504. During a video conference, multiple clients (e.g., user devices) may be connected to the video conference. A media stream may be received from each of the clients. A media stream may include audio and/or video data packets transmitted over a network and is processed in real-time to facilitate interactive communication among participants. A media stream initiating from a client device may include an audio stream captured by audio input device (e.g., microphone) of the client device. The media stream may include video data. For example, if an image capture device (e.g., a camera) of the client device is enabled during the conference, then the media stream may include video data captured by the image capture device.

Based on the media streams 502 and the conference settings 504, the dynamic speakers software 500 updates a conferencing user interface 506. The conferencing user interface 506 includes at least a stage area. The dynamic speakers software 500 configures the stage area to prominently feature conference participants based on their respective speaker scores. For brevity, the description herein includes statements such as "the dynamic speakers software 500 displays/removes a conference participant in/from the stage area." Such statements should be understood to mean that the dynamic speakers software 500 displays/removes a digital representation of the conference participant in/from the stage area. The digital representation may be an image (e.g., video) stream associated with the conference participant, an image associated with the conference participant, a label (e.g., the name) associated with the conference participant, or some other digital representation indicative or descriptive of the associated conference participant.

The dynamic speakers software 500 includes tools, such as programs, subprograms, functions, routines, subroutines, operations, and/or the like for dynamically and concurrently highlighting multiple speakers in a conference (e.g., a video conference). As shown, the dynamic speakers software 500 includes an audio analysis tool 508, a speaker scoring tool 510, a conference configuration tool 512, and a user interface management tool 514. The operations of the dynamic speakers software 500 are further illustrated with respect to FIGS. 6A-6B.

The audio analysis tool 508 may be configured to process the media streams 502 to detect voice activity. The audio analysis tool 508 may utilize digital signal processing techniques to identify characteristics indicative of speech, such as amplitude, frequency, and cadence. The audio analysis tool 508 may use voice activity detection techniques to differentiate between the speaking participant and background noise. The audio analysis tool 508 may use or include one or more machine learning models trained to recognize distinct voices, thus attributing speech to the correct participant within the conference. Such a machine learning model may be trained to understand the nuances of speech that distinguish speech from non-speech elements in an audio stream. For example, such a machine learning model may be a classification engine, such as a neural network, logistic regression, or k-Nearest Neighbor model, which is trained using supervised, semi-supervised, or unsupervised learning according to a data set representing speech and non-speech audio content.

To determine periods of speech and silence in an audio stream associated with a conference participant, the audio analysis tool 508 may first digitize the audio stream (if not already in digital form). Digitizing the audio stream may involve sampling the analog signal at a consistent rate and quantizing these samples into a series of numbers that represent the sound wave over time. Once in a digital format, the audio stream may be processed through a series of computational processes designed to detect the presence or absence of speech.

To detect speech, the audio analysis tool 508 may analyze the energy levels of an audio signal. Active speech phases cause energy level fluctuations reflecting a human voice's sound waves, whereas silence periods can be marked by minimal energy variation, signifying no vocal activity. Utilizing algorithms such as Voice Activity Detection (VAD), which may be or include machine learning, the audio analysis tool 508 can distinguish between speech, background noise, and silence. Additionally, the audio analysis tool 508 may apply Fast Fourier Transform (FFT) algorithms to convert audio data from the time domain to the frequency domain. This conversion facilitates easier identification of speech components across varied frequencies. By analyzing spectral content and its temporal changes, the audio analysis tool 508 can predict the commencement and cessation of speech activity with accuracy.

Updating the speaker score based on speech and silence requires real-time analysis. The audio analysis tool 508 operates over predefined measurement durations (e.g., 1 second). That is, the audio analysis tool 508 may partition the audio stream into segments, each corresponding to the measurement duration. Each segment is determined to be a speech segment or a silence segment. As each segment is analyzed, the audio analysis tool 508 may transmit the determination of whether the segment is speech or silence to the speaker scoring tool 510, which updates the speaker score of the conference participant based on the determination.

The audio analysis tool 508 may include or utilize natural language processing (NLP) algorithms or other machine learning techniques to analyze and identify a context or content of the spoken words during a conference. The context or content can be used to identify a conference participant as a potential speaker (i.e., to be displayed in the stage area). The context or content can also be used to keep a conference participant highlighted (e.g., displayed in the stage area) despite a prolonged period of silence, as further described herein.

The speaker scoring tool 510 assigns and maintains a speaker score (e.g., a numeral value) for each conference participant. A speaker score maintained for a conference participant is based on speech activity identified in the media stream corresponding to that conference participant. That is, the speaker score is maintained based on the media stream received from the client device used by that conference participant to connect to the conference. The speaker scoring tool 510 maintains the speaker scores based on the determinations received from the audio analysis tool 508.

The scoring can be dynamic. That is, the speaker scoring tool 510 may continuously update the speaker scores in real-time as participants speak or remain silent. The mechanism of scoring may be based on factors such as the duration and frequency of speech, with higher scores awarded to those who speak more often or for longer periods. The user interface management tool 514 uses the speaker scores to determine which participants are considered active speakers.

The speaker scoring tool 510 may incorporate a sorting mechanism that ranks conference participants based on their respective speaker scores, thus facilitating the identification of the most active speakers at any given moment. The ranking can be updated in real-time as the speaker scores change. The speaker scoring tool 510 may integrate provisions for spotlighted and pinned participants (explained further below). The speaker scoring tool 510 may automatically place spotlighted and pinned conference participants at the top of the ranking, above the sorted list based on active speech scores. Spotlighted participants may be prioritized due to their designated importance in the conference, while pinned participants are elevated in rank to align with individual user preferences of conference participants.

The speaker scoring tool 510, in conjunction with the audio analysis tool 508, can be used to facilitate the inclusion of participants onto the stage area based on contextual cues. To illustrate, and without limitations, when Alice (e.g., a first conference participant) transitions to a new discussion topic and introduces Sarah (e.g., a second conference participant), the dynamic speakers software 500 can identify the mention of Sarah and preemptively prepare to highlight Sarah (e.g., add Sarah to the stage area). The dynamic speakers software 500 can automatically bring Sarah onto the stage or can do so immediately upon detecting Sarah's voice. This proactive feature enhances the fluidity of the meeting, ensuring that all relevant participants are promptly highlighted.

The conference configuration tool 512 may receive the conference settings 504. The conference settings 504 may include settings usable by the dynamic speakers software 500 in customizing speaker visibility and conferencing user interface preferences of the conference participant. The conference configuration tool 512 may store or retrieve (such as by querying the conferencing software 406 of FIG. 4) at least some of the conference settings included in the conference settings 504. The conference configuration tool 512 may enable a conference participant to modify at least some of the conference settings 504, such as via user interfaces associated with the conference configuration tool 512 during a conference. To illustrate, the conference configuration tool 512 may enable the conference participant to pin or unpin conference participants.

The conference settings 504 may include a list of spotlighted conference participants. A spotlighted conference participant is one considered to be an active speaker regardless of speech activities of the spotlighted conference participant. As such, the speaker scoring tool 510 may not maintain a speaker score for a spotlighted conference participant. A spotlighted conference participant is added to a stage area, as described herein. A spotlighted conference participant is considered to be an active speaker for all of the conference participants of the conference.

The conference settings 504 may include one or more pinned conference participants. Individual conference participants may pin preferred conference participants thereby customizing their personal views of active speakers, acknowledging that different participants may desire a continuous visual focus on particular pinned conference participants. As such, different conference participants with different pinned participants are able to create unique and customized user experiences. A pinned conference participant can be said to be pinned by a pinning conference participant. A pinned conference participant is one considered to be an active speaker, for the pinning conference participant, regardless of speech or silence durations of the pinned conference participant. As such, with respect to the pinning conference participant, the speaker scoring tool 510 may not maintain a speaker score for a pinned conference participant. A pinned conference participant is added to a stage area, as described herein. Again, a pinned conference participant is considered to be an active speaker for the pinning conference participant.

The conference settings 504 may include a user preference indicating whether the conference participant associated with the dynamic speakers software 500 is to appear as an active speaker when they are speaking or whether to remain unhighlighted. That is, a conference participant may indicate whether the dynamic speakers software 500 is to display them in the stage area of the conferencing user interface 506 at the device of the conference participant.

The user interface management tool 514 may be configured to update the user interface, specifically whether to show or hide the stage area, whether to add or remove conference participants from the stage area based on the speaker scores and conference settings 504. The user interface management tool 514 can be configured to dynamically update the layout of the conferencing user interface 506 in response to changes in identified speech activity, as determined by the audio analysis tool 508 and the speaker scoring tool 510.

The user interface management tool 514 utilizes the ranking data (described above with respect to the speaker scoring tool 510) to visually represent active speakers within the stage area of the conferencing user interface 506. The prioritization of spotlighted and pinned participants by the speaker scoring tool 510 ensures that they are prominently displayed, independent of their moment-to-moment speech activity, while the remainder of the participant ranking is continuously adjusted to reflect the flow of conversation.

The user interface management tool 514 is configured to manage the graphical elements such as borders, spotlight effects, and tile sizes, ensuring that active speakers are visually accentuated. Additionally, the user interface management tool 514 tool may be configured to handle user interactions with the conferencing user interface 506, such as pinning or unpinning participants, resizing the displayed media streams, and transitioning between different views. That is, the user interface management tool 514 may include user interface controls in the conferencing user interface 506 to facilitate such actions.

In some implementations, a conference participant may be designated as an active speaker after a minimum threshold of contiguous speaking time (e.g., after 2.5 seconds of contiguous speech); and a conference participant may be removed from the stage area following a minimum threshold of silence (e.g., 20 seconds of silence). However, other rules (such as those described with respect to FIG. 7) for displaying and removing conference participants from the stage area may be used.

In some implementations, the dynamic speakers software 500, such as through the user interface management tool 514, may be configured to facilitate the visual representation of active speakers in a video conference (e.g., in the conferencing user interface 506). The user interface management tool 514 may employ (e.g., may be configured with) a set of rules to dynamically manage the stage area of the conferencing user interface 506.

In some implementations, when a single conference participant is pinned or spotlighted, the dynamic speakers software 500 may transition the conferencing user interface 506 to the speaker view. If the conferencing user interface 506 is configured to return to the dynamic view (e.g., the gallery and stage areas view), the pinned or spotlighted participants are displayed in the stage area while being omitted from the gallery area to prevent redundancy.

In some implementations, the user interface management tool 514 may be configured to adapt the conferencing user interface 506 to the total number of conference participants in the conference and their activities. For example, when no active speakers are detected and/or fewer than a minimum number of conference participants (e.g., less than five conference participants) are connected to the conference, the conference participants are displayed in the gallery layout and the stage area is not displayed (e.g., is hidden). Conversely, when active speakers are detected and the conference includes more than the minimum number of the conference participants (e.g., five or more participants), the conferencing user interface 506 is configured to include the gallery area and the stage area. The stage area may be configured to, by default, occupy a first percentage (e.g., 70%) of the height of the conferencing user interface 506. However, the conferencing user interface 506 may include user interface controls that enable the modification of the relative sizes.

In some implementations, the dynamic speakers software 500 can be configured such that once participants are identified as active speakers and placed in the stage area, their positions are not rearranged based on real-time speaking activity. That is, the active speakers retain their sequence within the stage area until they are no longer considered active speakers. The order of the active speakers remains consistent to provide a stable visual reference for conference participants until they no longer meet the criteria for being considered active speakers, at which point they may be removed from the stage area of the conferencing user interface 506.

To illustrate, assume that Alice, Bob, and Charlie are identified as active speakers, based on their respective speaker scores, and placed in the stage area in the sequence: Alice, Bob, Charlie. Over time, Charlie speaks more often, gaining the highest speaker score. Despite this, the stage area keeps the original order—Alice, Bob, Charlie—unchanged, even though Charlie's score is highest, but Alice, Bob, and Charlie remain the speakers with the highest speaker scores. This illustrates that the initial speaking order is maintained in the stage area, regardless of changes in speaker scores. Furthermore, even when one of Alice, Bob, or Charlie is removed from the stage area, the other two may retain their locations in the stage area.

The dynamic speakers software 500 may be configured to vary (e.g., increase or decrease) the number of active speakers displayed in the stage area based on the total number of participants in the video conference, adhering to (e.g., constrained by) predefined maximums and incorporating spotlighted and pinned participants at the top of the list. To illustrate, and without limitations, in video conferences with fewer than 5 participants, all participants are shown in the gallery area and the stage area is not displayed; for 5-8 total conference participants, up to 2 active speakers can be displayed in the stage area; with 8-12 total conference participants, the limit increases to 3 active speakers in the stage area; and for more than 12 conference participants, up to 4 active speakers can be displayed in the stage area.

The user interface management tool 514 may be configured to animate transitions when the lineup of active speakers alters, such as via fading out, scaling, translating, and fading of tiles. The user interface management tool 514 may highlight (e.g., delineate with a visual cue) active speakers in the stage area when they speak, while not highlighting the speaking active speakers in the gallery area.

The user interface management tool 514 may be configured to hide non-video participants. A non-video participant is a conference participant of a video conference who is connected and can participate via audio but does not share video (e.g., may not have turned their camera on). As such, a non-video participant is one who is not associated with a video stream that initiates from a device that the participant used to connect to the conference. Such a conference participant may be represented by a digital representation that is a non-visual placeholder. The user interface management tool 514 may not display a non-video conference participant in the gallery area but would display the non-video conference participant based on the rules described herein (such as based on the speaker score and/or whether the non-video participant is spotlighted or pinned).

Figure 6A:
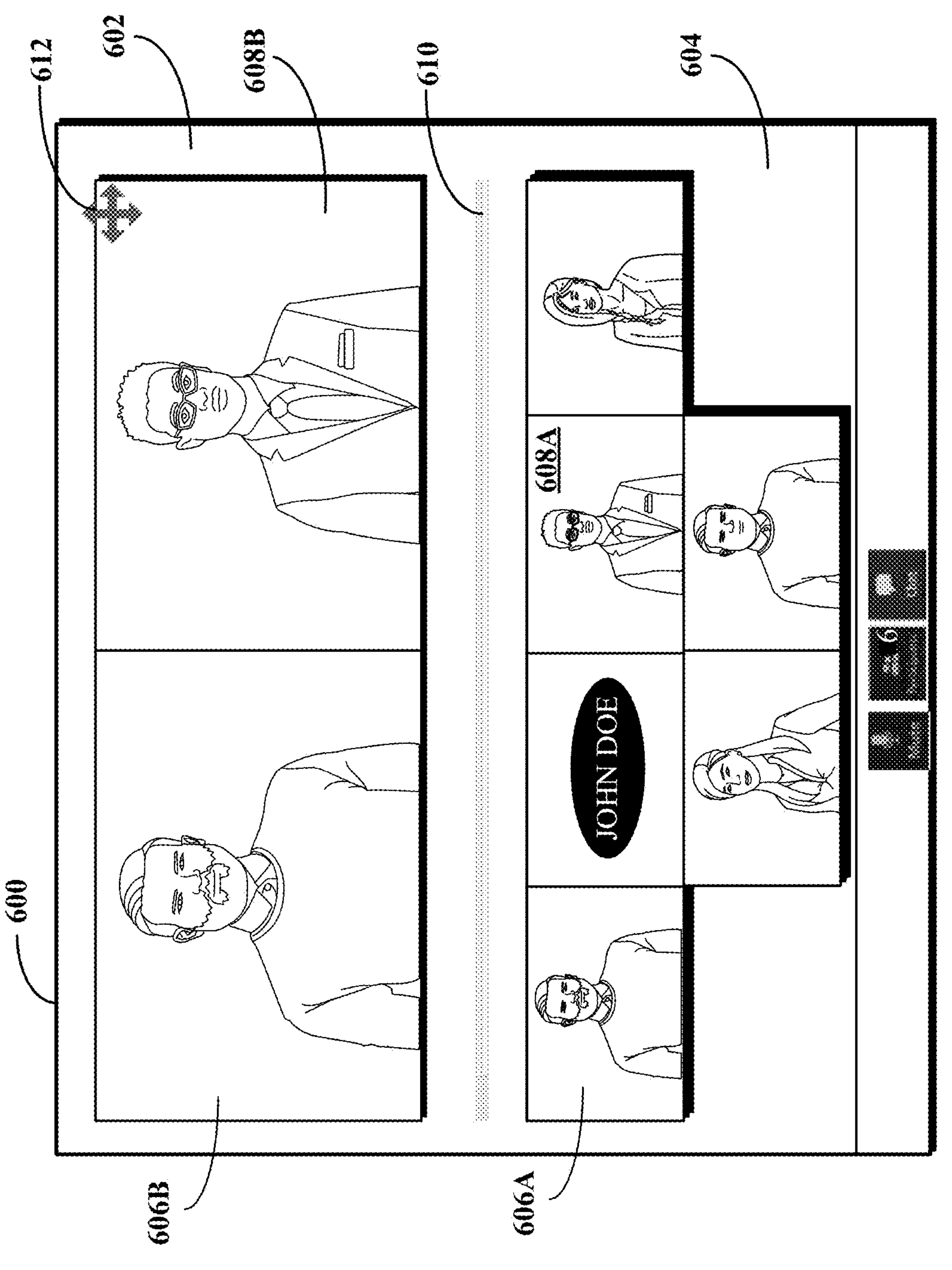
FIG. 6A illustrates an example of a conferencing user interface.

FIG. 6A illustrates an example of a conferencing user interface 600, which can be the conferencing user interface

506 of FIG. 5. The conferencing user interface 600 can be displayed at a device of a conference participant, such as the client 408 or the client 410 of FIG. 4. As such, the conferencing user interface 600 is said to be associated with the conference participant. The conferencing user interface 600 can be generated by a dynamic speakers software, such as the dynamic speakers software 500 of FIG. 5.

The conferencing user interface 600 illustrates that 6 conference participants are connected to a conference via their respective devices. The user interface 600 includes a stage area 602 and a gallery area 604. Each of the conference participants may be represented, in the gallery area 604, with a respective tile that includes a digital representation of that conference participant. Tiles 606A and 608A in the gallery area 604 represent two conference participants who have been identified as active speakers. As such, these conference participants have also been elevated to (e.g., are displayed in) the stage area 602, as demonstrated by tiles 606B and 608B, which mirror their presence in the gallery area 604. The tiles in the stage area 602 are larger than those in the gallery area 604.

An adjustable separator 610 enables the conference participant associated with the conferencing user interface 600 to configure the relative sizes of the two areas. The location of the adjustable separator 610 (e.g., the relative sizes of the areas) are retained, as a user preference, for future conferences. A repositioning control 612 enables the conference participant to customize the layout by dragging the stage area 602 to a preferred location (such as below the gallery area 604). The dynamic speakers software 500 may save this configuration for use in subsequent conferences.

Figure 6B:
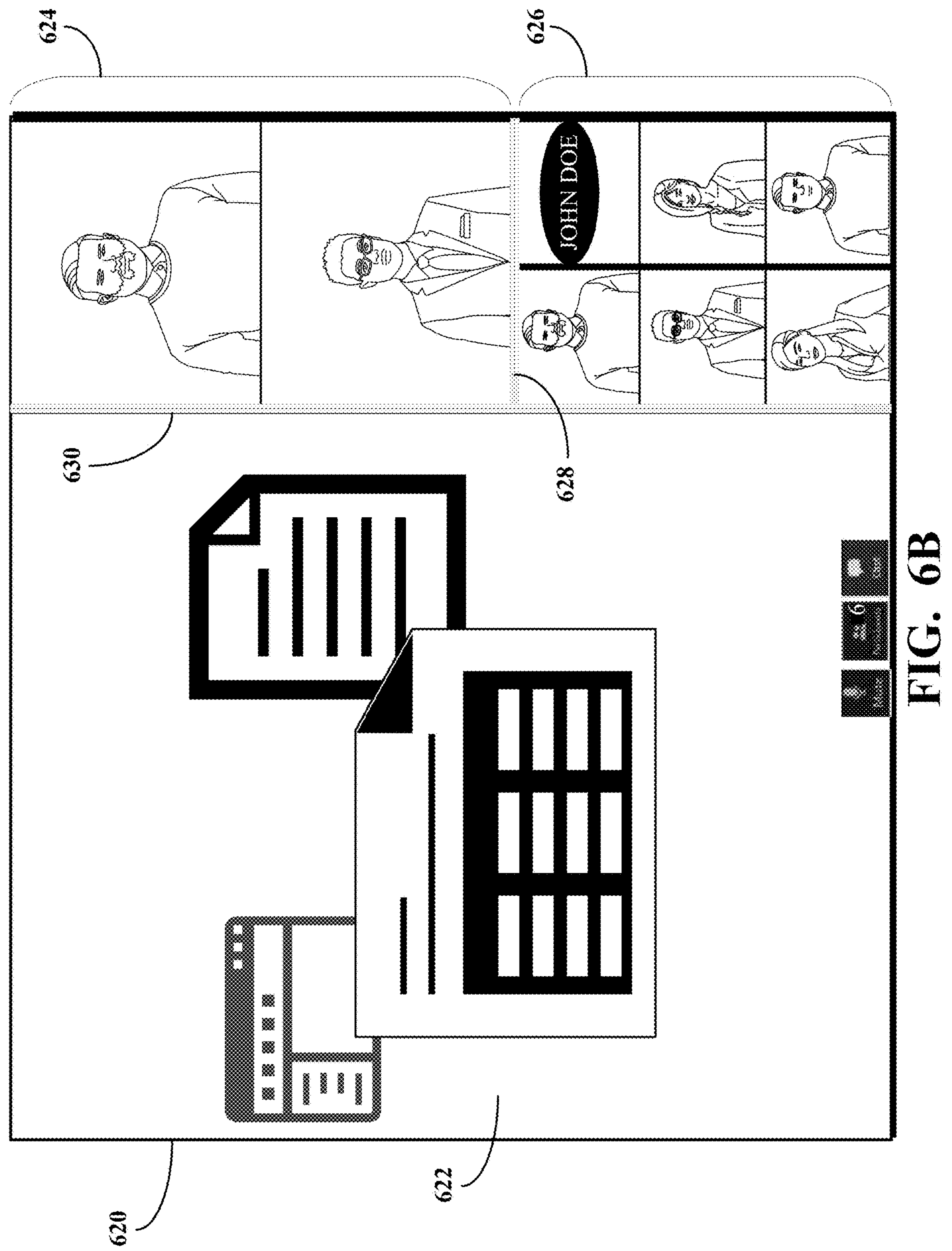
FIG. 6B illustrates an example of a conferencing user interface in the case of content sharing.

FIG. 6B illustrates an example of a conferencing user interface 620, which can also be the conferencing user interface 506 of FIG. 5, in the case of content sharing. For example, one of the conference participants may have enabled screen sharing to the conference. The user interface 620 includes a content area 622, a stage area 624, and a gallery area 626. The content area 622 displays the content that is shared in the conference. The content area may occupy a certain percentage (e.g., 75%) of the width of the conferencing user interface 620. However, the conference participant may adjust this value via a vertical adjustable separator 630.

Adjacent to the content area 622 is the stage area 624. Below the stage area 624 is the gallery area 626. The stage area 624 and the gallery area 626 occupy the remaining percentage (e.g., 25%) of the width of the conferencing user interface 620. An adjustable separator 628, which can be as described with respect to the adjustable separator 610 of FIG. 6A, enables the user to resize the stage area 624 and the gallery area 626. The titles can be flowed and/or resized to fit the allocated spaces of the stage area 624 and the gallery area 626.

Figure 7:
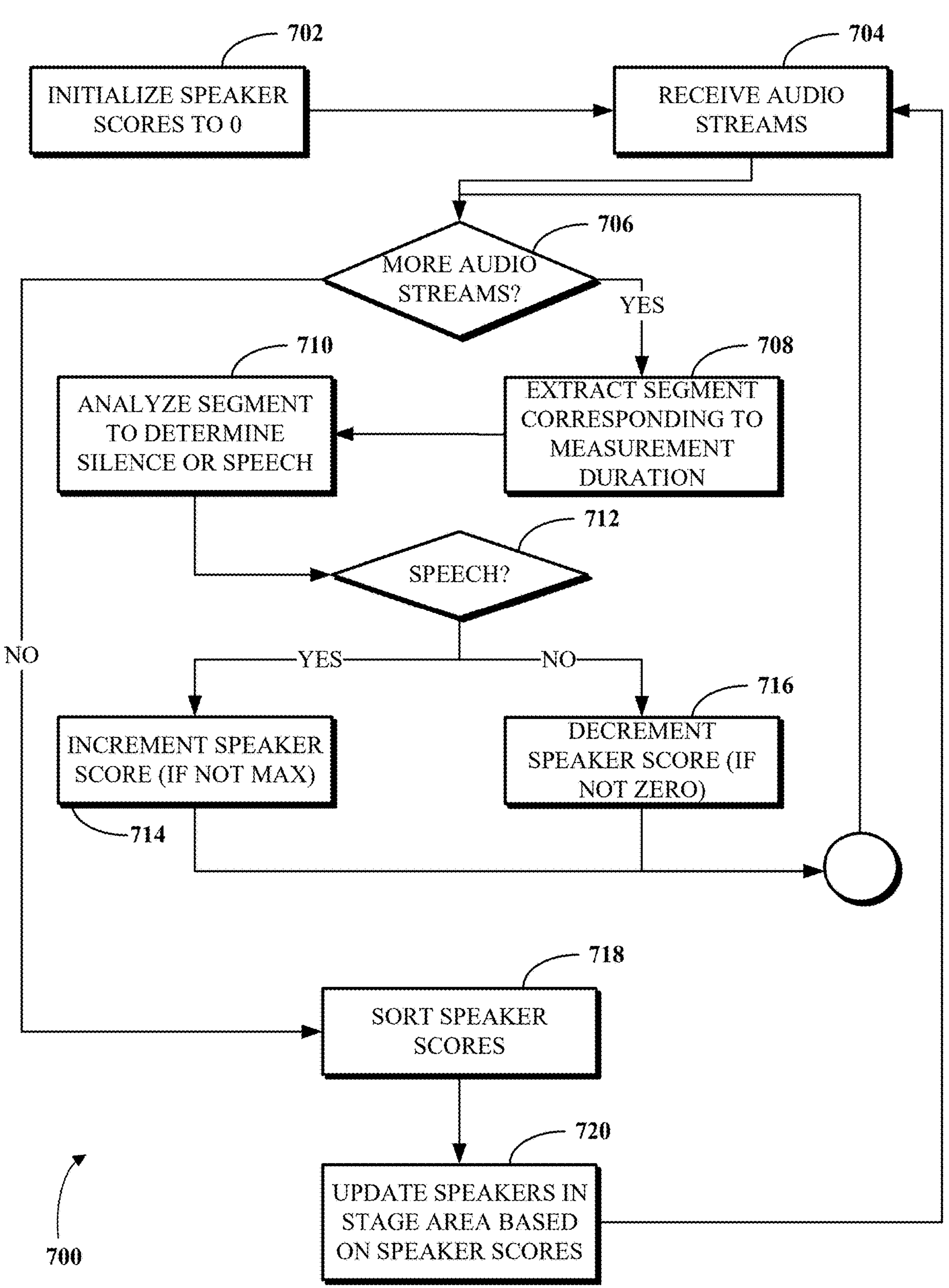
FIG. 7 is a flowchart of an example of a technique for maintaining speaker scores of conference participants of a conference.

To further describe some implementations in greater detail, reference is next made to examples of techniques which may be performed by or using a system for dynamic highlighting of multiple speakers. FIG. 7 is a flowchart of an example of a technique 700 for maintaining speaker scores of conference participants of a conference. The technique 700 can be executed using computing devices, such as the systems, hardware, and software described with respect to FIGS. 1-6B. The technique 700 can be implemented by a dynamic speakers software, such as the dynamic speakers software 500 of FIG. 5. The dynamic speakers software may be implemented by (e.g., execute at) a client device, such as the client 408 or the client 410 of FIG. 4. The dynamic speakers software may be implemented by (e.g., may execute at) a server device, such as the system 400 of FIG. 4. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof.

At 702, speaker scores are initialized to zero. A speaker score can be associated with at least some (e.g., each of) conference participants of the conference. When a new conference participant connects to the conference, a speaker score is initialized for that conference participant. As mentioned above, speaker scores may not be maintained for spotlighted and pinned participants.

At 704, audio streams are received. The audio streams are continuously received. The technique 700 partitions each of the received streams into segments and determines for each of the segments whether that segment is a speech segment or a silence segment. At 706, the technique 700 determines whether there are more streams to process. If so, the technique 700 proceeds to 708 to process the next audio stream; otherwise, the technique 700 proceeds to 718. At 708, the technique 700 extracts a segment corresponding to a predefined measurement duration. The segment is then analyzed, at 710, to determine if it contains speech or silence. Analyzing whether the audio segment is a speech segment or a silence segment can be as described with respect to audio analysis tool 508 of FIG. 5. In an implementation, more than one segment corresponding to the predefined measurement duration can be analyzed before the technique 700 proceeds to analyze segments of another stream.

At 712, the technique 700 (e.g., the speaker scoring tool 510 of FIG. 5) determines whether the extracted audio segment is speech. If speech is detected, the speaker score is incremented, at 714. The speaker score may be incremented by an increment step. In an example, the increment step can be 1. In an example, the technique 700 does not increment the speaker score if the speaker score is already at a maximum speaker score value (e.g., MAX). As such, the technique 700 may set the speaker score to maximum ((speaker score)+(increment step)), MAX). In an example, the maximum speaker score value may be MAX=30.

In some implementations, the technique 700 may determine whether to increment the speaker score, at 714, based on the content of the speech. For example, the technique 700 may determine that if the content of the speech does not pertain to a predetermined topic of discussion, such as an agenda item for a conference, the speaker score of the participating individual may not be incremented despite the presence of speech activity. This determination can be made by analyzing the speech content through a content analysis module incorporated within or accessible by the dynamic speakers software. The content analysis module may employ NLP algorithms or other machine learning techniques to assess the relevance of the speech content to the predetermined topics. Upon detecting speech that is unrelated to the topics of interest, the module may signal the speaker scoring tool, such as speaker scoring tool 510, not to increase the speaker score for the duration of such speech. This approach allows for a more nuanced and context-aware mechanism of speaker score management, ensuring that the speaker score is reflective not only of the quantity of speech but also of its relevance to the conference's thematic focus.

If no speech is detected at 712, the technique 700 decrements the speaker score by a decrement step, at 716. In an example, the decrement step can be 3. The minimum value (MIN) of the speaker score can be 0. As such, the technique 700 may set the speaker score to maximum((speaker score)−(decrement step)), MIN). After adjusting the score, the technique 700 proceeds back to 706 to process the next audio stream.

In some implementations, and while not specifically shown in FIG. 7, the technique 700 may first determine whether to decrement the speaker score based on the context or content of the spoken words during a conference. As mentioned, NLP algorithms or other machine learning techniques can be used to analyze the context and content of the spoken words during a conference. If the technique 700 determines that, given the current context or content, a silent speaker (i.e., a conference participant displayed in the stage area but not currently speaking) is likely to respond after a period a time, then the speaker score may not be decremented. The technique 700 may determine that the silent speaker is likely to respond if, for example, the spoken words indicate that the silent speaker is being asked a question or presented with a scenario, that the silent speaker is expected to present a rebuttal to an argument being presented, or that the silent speaker is the subject of the discussion.

To illustrate, and without limitations, consider a scenario where Alice, Bob, and Charlie are participants in a meeting. They each take turns speaking and appear on the stage stage. If Charlie remains silent for over 20 seconds while Alice and Bob discuss matters directly involving Charlie, the technique 700 recognizes the relevance of the ongoing conversation to Charlie. Consequently, Charlie is not removed from the stage despite the prolonged silence. This contextual analysis can ensure that participants are not inadvertently excluded from the stage when they are being discussed, maintaining the continuity and relevance of the speaker highlights.

At 718, speaker scores are sorted. At 720, the updated speaker scores are used (such as by the user interface management tool 514 of FIG. 5) to adjust a conferencing user interface associated with the conference, such as the conferencing user interfaces 506, 600, or 620 of FIG. 5, 6A, or 6B, respectively. Specifically, the technique 700 configures the stage area of the conferencing user interface, as described herein. From 720, the technique 700 loops back to 704 to continue receiving and processing audio streams, allowing for real-time updating of speaker highlights. As such, the technique 700 can be continuously executed at regular intervals, such as after each one-second segment of the audio streams have been accumulated (e.g., received), to ensure that the speaker scores are updated in real-time according to the active participation of each conference participant in the conference.

Figure 8:
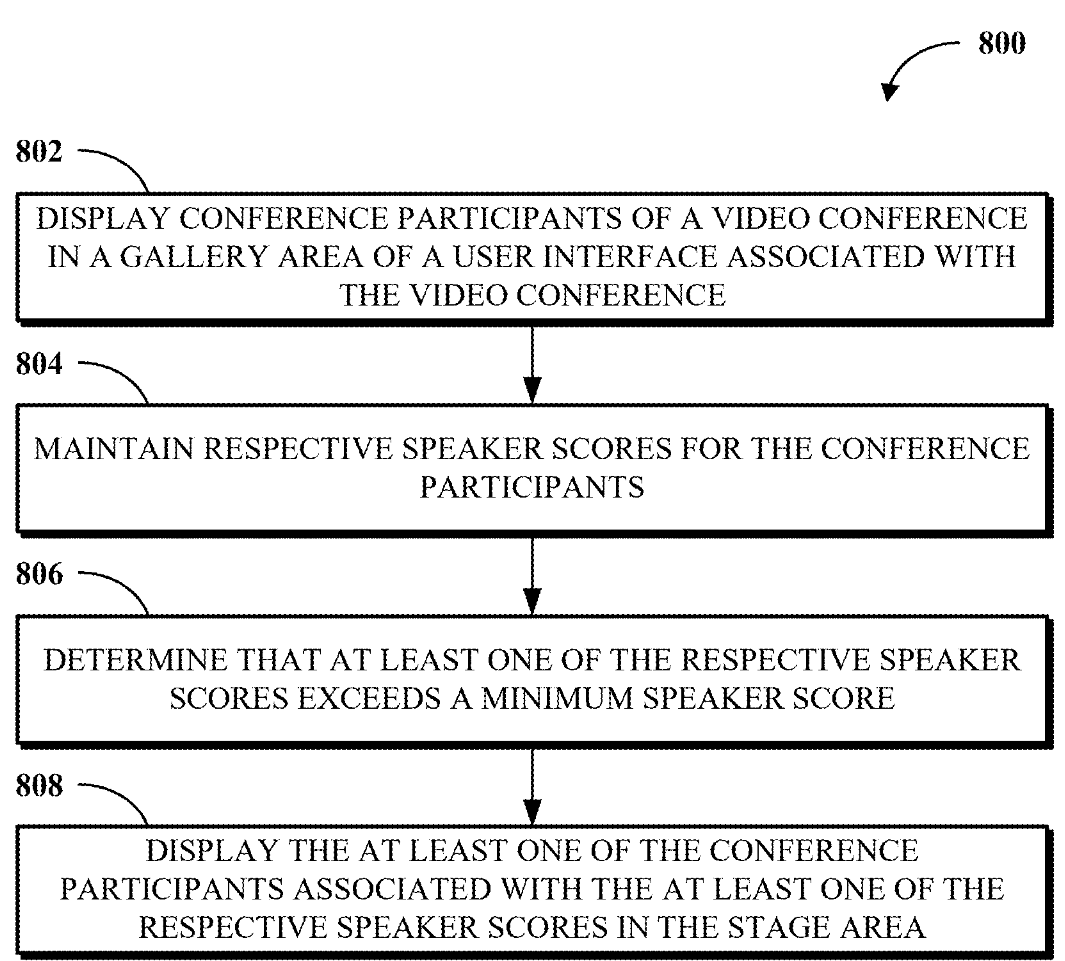
FIG. 8 is a flowchart of an example of a technique for highlighting multiple speakers in a video conference based on speaker scores.

FIG. 8 is a flowchart of an example of a technique 800 for highlighting multiple speakers in a video conference based on speaker scores. The technique 800 can be executed using computing devices, such as the systems, hardware, and software described with respect to FIGS. 1-6B. The technique 800 can be implemented by a dynamic speakers software, such as the dynamic speakers software 500 of FIG. 5. The dynamic speakers software may be implemented by (e.g., execute at) a client device, such as the client 408 or the client 410 of FIG. 4. The dynamic speakers software may be implemented by (e.g., may execute at) a server device, such as the system 400 of FIG. 4. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

At 802, conference participants of the video conference are displayed in a gallery area of a user interface associated with the video conference. That a conference participant is displayed in the gallery area (or in the stage area) includes that a digital representation of the conference participant is displayed in the gallery area (or in the stage area). The user interface can be the conferencing user interfaces 506 of FIG. 5. The user interface includes the gallery area and a stage area for active speakers. The stage area can be configured to accommodate a variable number of the active speakers based on detected speech activity, with a capability to display between one and a maximum number of speakers. The stage area and the gallery area can be positioned in the user interface based on a saved preference of a conference participant. The technique 800 may include providing an option for the conference participant to see of hide themselves as an active speaker in the stage area. The user interface can be configured to include a feature that enables the conference participant to adjust relative sizes of the stage area and the gallery area.

At 804, respective speaker scores for the conference participants are maintained based on respective durations of speech and respective durations of silence of the conference participants. Maintaining the respective speaker scores can include incrementing one of the respective speaker scores associated with one of the conference participants for each predefined amount of speech time in the respective durations of speech of the one of the conference participants. Maintaining the respective speaker scores can also include decrementing the one of the respective speaker scores for each predefined amount of silence time in the respective durations of silence of the one of the conference participants.

At 806, the technique 800 determines that at least one of the respective speaker scores associated with at least one of the conference participants exceeds a minimum speaker score. At 808, in response to determining that the at least one of the respective speaker scores exceeds the minimum speaker score, the at least one of the conference participants is displayed in the stage area.

The technique 800 may include determining that the video conference includes less than a minimum number of conference participants and, in response to determining that the video conference includes less than the minimum number of conference participants, the stage area is hidden, and the display of the active speakers in the stage area is stopped.

As described above, even if the speaker score exceeds the minimum necessary to make a conference participant eligible to be displayed in the stage area, the conference participant may be displayed in the stage area, such as in the case where the stage area already includes a maximum number of active speakers based on the total number of conference participants in the video conference. As such, the technique 800 may determine that a speaker score associated with another conference participant of the conference participants exceeds the minimum speaker score and then determines whether to display the another conference participant in the stage area based on a total number of the conference participants in the video conference and a total number of the active speakers displayed in the stage area.

As described above, if a current speaker is not displayed in the stage area, then their digital representation in the gallery area is highlighted. As such, the technique 800 can include determining that a speaker score associated with another conference participant of the conference participants exceeds the minimum speaker score and determining not to display the another conference participant in the stage area. In response to these determinations, a visual indicator distinguishing the another conference participant from other non-speaking participants of the conference participants can be displayed in the gallery area. The technique 800 may determine not to display the another conference participant in the stage area based on a total number of conference participants in the stage area.

The technique 800 may include receiving a user input marking a conference participant of the conference participants for display in the stage area. For example, the user input may designate the conference participant as a pinned conference participant or a spotlighted conference participant. In response to the user input (e.g., based on the user input), the conference participant can be displayed in the stage area without considering the speaker score associated with the conference participant.

As mentioned above, the conference settings 504 of FIG. 5 may include an indication to not display non-video participants in the gallery area. As such, the technique 800 may include determining that no camera feed is received from an active speaker and, in response to determining that no camera feed is received from the active speaker, the active speaker can be displayed in the stage area and not displaying the active speaker in the gallery area.

As mentioned above, if the number of conference participants does not exceed a minimal threshold of conference participants, then the stage area may not be displayed. As such, the technique 800 may include stopping display of the stage area in response to determining that a total number of conference participants of the video conference is below a minimal threshold. Conversely, if the video conference includes at least a minimum number of conference participants, then the stage area is displayed (e.g., unhidden).

Figure 9:
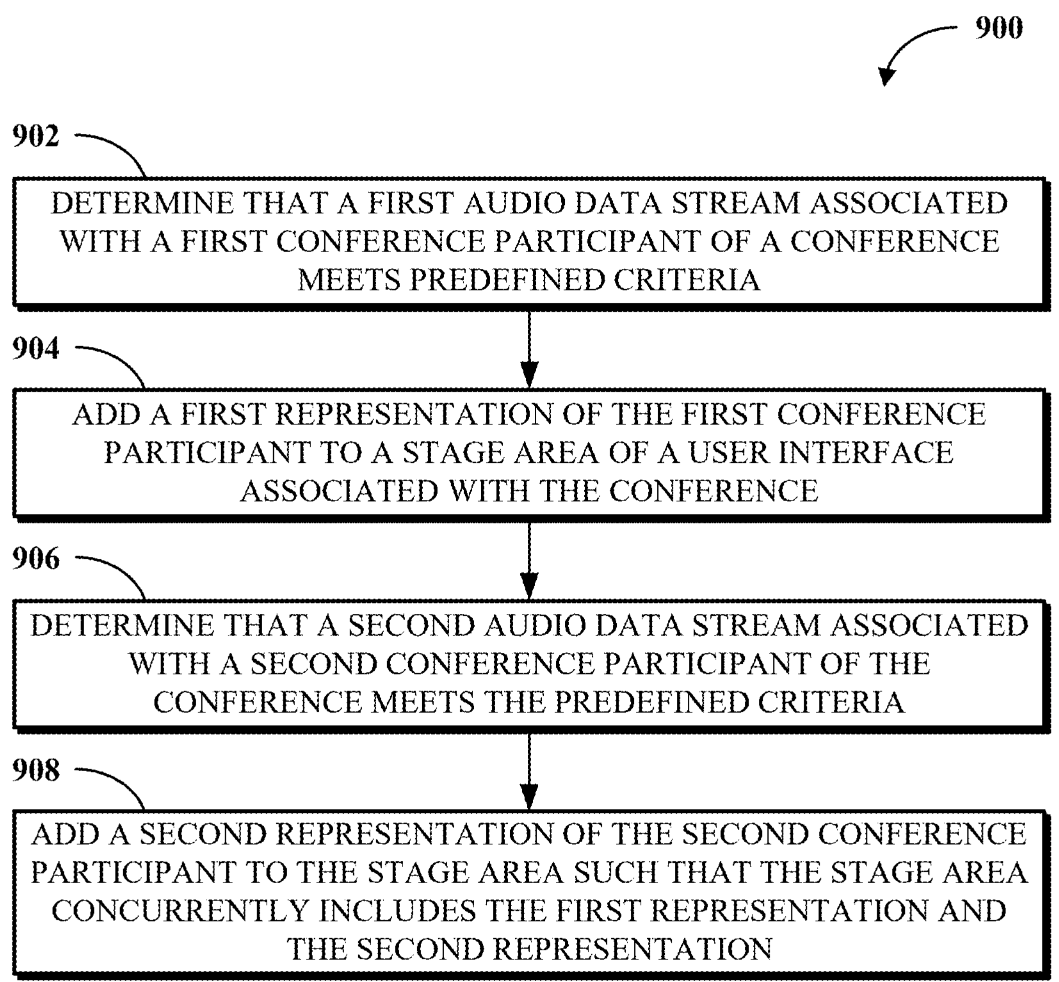
FIG. 9 is a flowchart of an example of a technique for concurrently highlighting speakers in a video conference.

FIG. 9 is a flowchart of an example of a technique 900 for concurrently highlighting speakers in a video conference. The technique 900 can be executed using computing devices, such as the systems, hardware, and software described with respect to FIGS. 1-6B. The technique 900 can be implemented by a dynamic speakers software, such as the dynamic speakers software 500 of FIG. 5. The dynamic speakers software may be implemented by (e.g., execute at) a client device, such as the client 408 or the client 410 of FIG. 4. The dynamic speakers software may be implemented by (e.g., may execute at) a server device, such as the system 400 of FIG. 4. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

At 902, the technique 900 determines that a first audio data stream associated with a first conference participant of a conference meets predefined criteria. The predefined criteria can be related to the detection of voice activity, specifically assessing whether the speech content in the first audio data stream exceeds a minimum threshold of speech duration and frequency, as described above. The first audio data stream may be evaluated to detect active speaking segments as opposed to periods of silence. The predefined criteria may include, for example, that speech segments should be continuous for at least a minimum threshold of contiguous speaking time (e.g., after 2.5 seconds of contiguous speech) and occur frequently enough to suggest active participation in the conversation. As such, the predefined criteria can be or include a minimum duration of continuous speech. The first representation can be maintained (e.g., included) in the stage area for at least a minimum duration of the conference even after a period of silence.

To analyze the first audio data stream and determine that it meets the predefined criteria, an audio analysis tool that uses digital signal processing techniques can be used. The audio analysis tool can process the audio data to identify characteristics indicative of speech, such as amplitude variations and spectral content, which differ significantly during periods of speech compared to silence.

At 904, in response to determining that the first audio data stream meets the predefined criteria, a first representation of the first conference participant is added to a stage area of a user interface associated with the conference. As described above, the user interface associated with the conference can include the stage area and a gallery area. The gallery area includes reduced size representations of at least some of the representations included in the stage area. As such, the technique 900 can include maintaining a reduced size representation of the first representation in the gallery area concurrently with a presence of the first representation in the stage area.

At 906, the technique 900 determines that a second audio data stream associated with a second conference participant of the conference meets the predefined criteria. Determining that the second audio stream meets the predefined criteria can be as described above, such as with respect to determining that the first audio stream meets the predefined criteria. At 908, in response to determining that the second audio data stream meets the predefined criteria, a second representation of the second conference participant is added to the stage area such that the stage area concurrently includes the first representation and the second representation.

If the second conference participant is a non-video participant, then a representation of the second conference participant is excluded from (e.g., not shown in) the gallery area even though the second representation is added to the stage area. As such, an active speaker may be displayed in the stage area but not displayed in the gallery area. If the second conference participant is pinned, then the second conference participant is pinned in the stage area for a duration of the conference (or until unpinned) regardless of speech or silence in the second audio data stream.

The technique 900 may include determining that the first audio data stream no longer meets the predefined criteria for a predefined period. In response to determining that the first audio data stream no longer meets the predefined criteria for the predefined period, the first representation is removed from the stage area. The technique 900 may determine that a third audio data stream associated with a third conference participant of the conference meets the predefined criteria. The technique 900 then determines whether to add a third representation of the third conference participant to the stage area based on a total number of participants of the conference. Whether to add the third representation in the stage area can be based on a total number of representations in the stage area.

An input indicating that a representation of a conference participant is to be added to the stage area may be received. For example, the input may indicate that the conference participant is to be pinned or spotlighted. As such, and as described above, the representation can be added to the stage area regardless of whether an audio data stream associated with the conference participant meets the predefined criteria.

The technique 900 may hide the stage area in response to determining that the conference includes fewer than a minimum number of conference participants, as described above. Conversely, if the conference includes at least a minimum number of conference participants, then the stage area is displayed (e.g., unhidden). As described above, if an active speaker is not in the stage area, then the technique 900 may provide a visual indicator in the gallery area for the participant not currently displayed in the stage area but is actively speaking.

For simplicity of explanation, the techniques 700, 800, and 900 of FIGS. 7, 8, and 9, respectively, are each depicted and described herein as a series of steps or operations. However, the steps or operations of the techniques 700 and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

It will be appreciated that the present disclosure may include any one and up to all of the following aspects.

A system of one or smore computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes determining that a first audio data stream associated with a first conference participant of a conference meets predefined criteria. The method also includes, in response to determining that the first audio data stream meets the predefined criteria, adding a first representation of the first conference participant to a stage area of a user interface associated with the conference, where the user interface includes the stage area and a gallery area. The method also includes determining that a second audio data stream associated with a second conference participant of the conference meets the predefined criteria. The method also includes, in response to determining that the second audio data stream meets the predefined criteria, adding a second representation of the second conference participant to the stage area such that the stage area concurrently includes the first representation and the second representation. Other embodiments of this aspect include corresponding computer systems, apparatus, and computer programs recorded on one or more computer storage devices, each configured to perform the actions of the methods. Implementations may include one or more of the following features.

The method may include determining that the first audio data stream no longer meets the predefined criteria for a predefined period; and in response to determining that the first audio data stream no longer meets the predefined criteria for the predefined period, removing the first representation from the stage area.

The method may include maintaining a reduced size representation of the first representation in the gallery area concurrently with the first representation in the stage area.

The method may include determining that the second conference participant is a non-video participant; and in response to determining that the second conference participant is the non-video participant, excluding a representation of the second conference participant from the gallery area.

The method may include determining that a third audio data stream associated with a third conference participant of the conference meets the predefined criteria; and determining whether to add a third representation of the third conference participant to the stage area based on a total number of participants of the conference.

The method may include receiving an input to add a third representation of a third conference participant to the stage area; and adding the third representation to the stage area regardless of whether a third audio data stream associated with the third conference participant meets the predefined criteria.

Implementations of the described techniques may include hardware, a method or process, or computer software on a computer-accessible medium.

One general aspect includes a device. The device includes one or more memories. The device also includes one or more processors. The one or more processors are configured to execute instructions stored in the one or more memories to determine that a first audio data stream associated with a first conference participant of a conference meets predefined criteria; in response to determining that the first audio data stream meets the predefined criteria, add a first representation of the first conference participant to a stage area of a user interface associated with the conference, where the user interface includes the stage area and a gallery area; determine that a second audio data stream associated with a second conference participant of the conference meets the predefined criteria; and in response to determining that the second audio data stream meets the predefined criteria, add a second representation of the second conference participant to the stage area such that the stage area concurrently includes the first representation and the second representation. Other embodiments of this aspect include corresponding computer systems, apparatus, and computer programs recorded on one or more computer storage devices, each configured to perform the actions of the methods.

Implementations may include one or more of the following features.

The device where the predefined criteria may include a minimum duration of continuous speech.

The first representation can be maintained in the stage area for at least a minimum duration of the conference.

The one or more processors can be configured to execute instructions stored in the one or more memories to maintain a corresponding representation to the first representation in the gallery area in addition to the first representation in the stage area.

The one or more processors can be configured to execute instructions stored in the one or more memories to determine that a third audio data stream associated with a third participant meets the predefined criteria; and determine whether to add a third representation for the third participant in the stage area based on a total number of representations in the stage area.

The one or more processors can be configured to execute instructions stored in the one or more memories to detect a cessation of speech from the second conference participant; and remove the second representation from the stage area.

The second conference participant can be pinned in the stage area for a duration of the conference.

The one or more processors can be configured to execute instructions stored in the one or more memories to remove the first representation from the stage area based on the first audio data stream no longer meeting the predefined criteria for a predefined period.

Implementations of the described techniques may include hardware, a method or process, or computer software on a computer-accessible medium.

One general aspect includes a non-transitory computer-readable storage medium that includes executable instructions that, when executed by a processor, facilitate performance of operations. The operations include determining that a first audio data stream associated with a first conference participant of a conference meets predefined criteria; in response to determining that the first audio data stream meets the predefined criteria, adding a first representation of the first conference participant to a stage area of a user interface associated with the conference, where the user interface includes the stage area and a gallery area; determining that a second audio data stream associated with a second conference participant of the conference meets the predefined criteria; and, in response to determining that the second audio data stream meets the predefined criteria, adding a second representation of the second conference participant to the stage area such that the stage area concurrently includes the first representation and the second representation. Other embodiments of this aspect include corresponding computer systems, apparatus, and computer programs recorded on one or more computer storage devices, each configured to perform the actions of the methods.

Implementations may include one or more of the following features.

The operations may include receiving an input to pin the second conference participant; and maintaining the second representation in the stage area independent of voice activity in the second audio data stream.

The operations may include hiding the stage area in response to determining that the conference includes fewer than a minimum number of conference participants.

The operations may include displaying the stage area in response to determining that the conference includes at least a minimum number of conference participants.

The operations may include providing a visual indicator in the gallery area for a participant not currently displayed in the stage area but actively speaking.

The operations may include displaying an active speaker in the stage area; and not displaying the active speaker in the gallery area.

Implementations of the described techniques may include hardware, a method or process, or computer software on a computer-accessible medium.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random-access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

maintaining, for each of a plurality of conference participants of a conference, a respective speaker score based on speech activity in a respective audio data stream of each conference participant, wherein the speaker score is incremented in response to speech segments detected in the respective audio data stream and decremented in response to silence segments detected in the respective audio data stream;

determining that a first audio data stream associated with a first conference participant of the conference meets predefined criteria, wherein the predefined criteria comprises the respective speaker score of the first conference participant exceeding a threshold;

in response to determining that the first audio data stream meets the predefined criteria, adding a first representation of the first conference participant to a stage area of a user interface associated with the conference, wherein the user interface includes the stage area and a gallery area;

determining that a second audio data stream associated with a second conference participant of the conference meets the predefined criteria, wherein the predefined criteria comprises the respective speaker score of the second conference participant exceeding the threshold; and in response to determining that the second audio data stream meets the predefined criteria, adding a second representation of the second conference participant to the stage area such that the stage area concurrently includes the first representation and the second representation.

2. The method of claim 1, further comprising:

determining that the first audio data stream no longer meets the predefined criteria for a predefined period; and in response to determining that the first audio data stream no longer meets the predefined criteria for the predefined period, removing the first representation from the stage area.

3. The method of claim 1, further comprising:

maintaining a reduced size representation of the first conference participant in the gallery area concurrently with the first representation in the stage area, wherein the gallery area displays the reduced size representation of the first conference participant independent of whether the first conference participant is displayed in the stage area.

4. The method of claim 1, further comprising:

determining that the second conference participant is a non-video participant; and in response to determining that the second conference participant is the non-video participant, excluding a representation of the second conference participant from the gallery area.

5. The method of claim 1, further comprising:

determining that a third audio data stream associated with a third conference participant of the conference meets the predefined criteria; and determining whether to add a third representation of the third conference participant to the stage area based on a total number of participants of the conference.

6. The method of claim 1, further comprising:

receiving an input to add a third representation of a third conference participant to the stage area; and adding the third representation to the stage area regardless of whether a third audio data stream associated with the third conference participant meets the predefined criteria.

7. The method of claim 1, wherein the threshold is a first threshold, further comprising:

removing the first representation from the stage area in response to the respective speaker score of the first conference participant falling below a second threshold, wherein the second threshold is less than the first threshold, wherein the first representation is maintained in the stage area during silence of the first conference participant until the respective speaker score of the first conference participant falls below the second threshold.

8. A device, comprising:

one or more memories; and one or more processors, the one or more processors configured to execute instructions stored in the one or more memories to:

maintain, for each of a plurality of conference participants of a conference, a respective speaker score based on speech activity in a respective audio data stream of each conference participant, wherein the speaker score is incremented in response to speech segments detected in the respective audio data stream and decremented in response to silence segments detected in the respective audio data stream;

determine that a first audio data stream associated with a first conference participant of the conference meets predefined criteria, wherein the predefined criteria comprises the respective speaker score of the first conference participant exceeding a threshold;

in response to determining that the first audio data stream meets the predefined criteria, add a first representation of the first conference participant to a stage area of a user interface associated with the conference, wherein the user interface includes the stage area and a gallery area;

determine that a second audio data stream associated with a second conference participant of the conference meets the predefined criteria, wherein the predefined criteria comprises the respective speaker score of the second conference participant exceeding the threshold; and in response to determining that the second audio data stream meets the predefined criteria, add a second representation of the second conference participant to the stage area such that the stage area concurrently includes the first representation and the second representation.

9. The device of claim 8, wherein the first representation is maintained in the stage area for at least a minimum duration of the conference.

10. The device of claim 8, wherein the one or more processors are configured to execute instructions stored in the one or more memories to:

maintain a corresponding representation to the first representation in the gallery area in addition to the first representation in the stage area.

11. The device of claim 8, wherein the one or more processors are configured to execute instructions stored in the one or more memories to:

determine that a third audio data stream associated with a third participant meets the predefined criteria; and determine whether to add a third representation for the third participant in the stage area based on a total number of representations in the stage area.

12. The device of claim 8, wherein the one or more processors are configured to execute instructions stored in the one or more memories to:

detect a cessation of speech from the second conference participant; and remove the second representation from the stage area.

13. The device of claim 8, wherein the second conference participant is pinned in the stage area for a duration of the conference.

14. The device of claim 8, wherein the one or more processors are configured to execute instructions stored in the one or more memories to:

remove the first representation from the stage area based on the first audio data stream no longer meeting the predefined criteria for a predefined period.

15. A non-transitory computer-readable storage medium, comprising executable instructions that, when executed by a processor, facilitate performance of operations, comprising:

maintaining, for each of a plurality of conference participants of a conference, a respective speaker score based on speech activity in a respective audio data stream of each conference participant, wherein the speaker score is incremented in response to speech segments detected in the respective audio data stream and decremented in response to silence segments detected in the respective audio data stream;

determining that a first audio data stream associated with a first conference participant of the conference meets predefined criteria, wherein the predefined criteria comprises the respective speaker score of the first conference participant exceeding a threshold;

in response to determining that the first audio data stream meets the predefined criteria, adding a first representation of the first conference participant to a stage area of a user interface associated with the conference, wherein the user interface includes the stage area and a gallery area;

determining that a second audio data stream associated with a second conference participant of the conference meets the predefined criteria, wherein the predefined criteria comprises the respective speaker score of the second conference participant exceeding the threshold; and in response to determining that the second audio data stream meets the predefined criteria, adding a second representation of the second conference participant to the stage area such that the stage area concurrently includes the first representation and the second representation.

16. The non-transitory computer-readable storage medium of claim 15, wherein the operations further comprise:

receiving an input to pin the second conference participant; and maintaining the second representation in the stage area independent of voice activity in the second audio data stream.

17. The non-transitory computer-readable storage medium of claim 15, wherein the operations further comprise:

hiding the stage area in response to determining that the conference includes fewer than a minimum number of conference participants.

18. The non-transitory computer-readable storage medium of claim 15, wherein the operations further comprise:

displaying the stage area in response to determining that the conference includes at least a minimum number of conference participants.

19. The non-transitory computer-readable storage medium of claim 15, wherein the operations further comprise:

providing a visual indicator in the gallery area for a participant not currently displayed in the stage area but actively speaking.

20. The non-transitory computer-readable storage medium of claim 15, wherein the operations further comprise:

displaying an active speaker in the stage area; and not displaying the active speaker in the gallery area.

* * * * *